United States Patent
Dalvie et al.

(10) Patent No.: US 7,062,270 B1
(45) Date of Patent: Jun. 13, 2006

(54) SYSTEM AND METHOD FOR CONTROLLING DOMESTIC ROAMING

(75) Inventors: Sashikala Dalvie, Danville, CA (US); Daryl Gazzard, Alpharetta, GA (US)

(73) Assignee: Cingular Wireless II, L.L.C., Atlanta, GA (US)

( * ) Notice: Subject to any disclaimer, the term of this patent is extended or adjusted under 35 U.S.C. 154(b) by 231 days.

(21) Appl. No.: 10/699,733

(22) Filed: Nov. 4, 2003

(51) Int. Cl.
*H04Q 7/20* (2006.01)

(52) U.S. Cl. ............ 455/433; 455/432.1; 455/432.2

(58) Field of Classification Search ............ 455/432.1, 455/432.2, 433, 435.1, 435.2, 436–440, 40
See application file for complete search history.

(56) References Cited

U.S. PATENT DOCUMENTS

| | | | |
|---|---|---|---|
| 5,815,808 A * | 9/1998 | Valentine ............... | 455/422.1 |
| 5,884,172 A * | 3/1999 | Sawyer .................. | 455/435.1 |
| 6,104,929 A * | 8/2000 | Josse et al. ............. | 455/445 |
| 6,134,438 A * | 10/2000 | Sawyer .................. | 455/433 |
| 6,314,288 B1 * | 11/2001 | Murdock-Armstrong . | 455/426.1 |
| 6,463,055 B1 * | 10/2002 | Lupien et al. ........... | 370/353 |
| 6,643,511 B1 * | 11/2003 | Rune et al. .............. | 455/433 |
| 2002/0123348 A1 * | 9/2002 | Willars et al. ........... | 455/436 |
| 2003/0027572 A1 * | 2/2003 | Karlsson et al. ......... | 455/433 |

* cited by examiner

*Primary Examiner*—CongVan Tran
(74) *Attorney, Agent, or Firm*—Pillsbury Winthrop Shaw Pittman LLP

(57) ABSTRACT

The present invention enables a home network operator to control roaming of its subscribers. A mobile initiates a location update procedure by sending a "Location Updating" message containing an IMSI and a LAI to a MSC/VLR in a visited network. The MSC/VLR in turn sends an "UpdateLocation" message including the LAI, the IMSI, and a VLR address to a HLR in a home network. A Roaming Enhancement Node (REN) in the home network intercepts the "UpdateLocation" message and determines whether to continue registration based on the LAI in the message. If the mobile is roaming in a location area that is restricted, the REN sends a rejection response with a rejection cause to the MSC/VLR. The MSC/VLR in turn sends another rejection response with the same rejection cause to the mobile. If the mobile is roaming in a location area that is not restricted, the "UpdateLocation" message is forwarded to the HLR.

18 Claims, 4 Drawing Sheets

SYSTEM AND METHOD FOR CONTROLLING DOMESTIC ROAMING

BACKGROUND OF THE INVENTION

1. Field of the Invention

The present invention relates generally to communication systems and, more particularly, to providing an improved method for controlling roaming in wireless communication systems.

2. Description of Related Art

Global System for Mobile communication (GSM) is one of the most widely used wireless access systems in today's fast growing communication infrastructure. As is well known, main components of a GSM network include a Mobile Station (MS or "mobile"), at least one Base Transceiver Station (BTS), a Base Station Controller (BSC), a Mobile Switching Center (MSC), a Home Location Register (HLR), and a Visitor Location Register (VLR). The MS typically consists of Mobile Equipment (ME) along with a Subscriber Identity Module (SIM). The BTS is physical equipment, such as a radio tower, that enables a radio interface to communicate with a MS. A BTS may serve more than one MS. The BSC manages radio resources, including a BTS, and may be connected to several BTSs. The BSC and BTS components, in combination, are generally referred to as a Base Station System (BSS). The MSC performs a switching function for the network, as well as registration, authentication, location updating, handovers, and call routing, among other functions. The HLR is a database used to store and manage subscriber information for mobile subscribers belonging to a specific network provider. The HLR also stores the current location of each MS. The VLR is a database that contains a profile of subscribers registered on the associated MSC. The VLR also contains information regarding a geographical location of MS's current location.

A GSM network is made up of a hierarchy of geographic areas: cells, location areas (LAs), MSC areas, and a public land mobile network (PLMN) area. A cell corresponds to an area served by one BTS and each cell is assigned by a cell global identity (CGI), which is broadcasted by the BTS. The CGI is made up of a Mobile Country Code (MCC), a Mobile Network Code (MNC), a Location Area Code (LAC), and a Cell Identity (CI). A location area is a cluster of cells served by one or more BSCs, which are themselves controlled by a single MSC. The location area is identified by its Location Area Identity (LAI), which is also broadcasted by a BTS. The LAI is made up of a MCC, a MNC, and a LAC. The MSC area is a region of a network controlled by a single MSC, and typically consists of one or more location area. A PLMN area is an area in which communication services are provided by one network operator (i.e., service provider). Individual PLMNs are identified by their MCC and MNC, where the MNC specifies a home PLMN (HPLMN) of a MS (i.e., subscriber).

When a mobile powers on, the mobile camps onto a cell in which it is currently located and listens for a CGI broadcasted by the BTS of the cell. The mobile then selects a network service provider based only on a MNC and a MCC in the CGI and stores a LAI broadcasted by the BTS. Once the mobile selects a network service provider, the mobile attempts to register with the network by performing a location update procedure.

FIG. 1 illustrates a conventional location update procedure. Mobile 102 initiates a location update procedure by sending a "Location Updating" message to MSC/VLR 108 in visited network 112, via BTS 104 and BSC 106. The "Location Updating" message contains a LAI and an International Mobile Subscriber Identity (IMSI) which consists of a MCC, a MNC, and a Mobile Subscriber Identification Number (MSIN). The MSC/VLR receives the message and determines whether the mobile is allowed to roam on its network. This is accomplished by comparing the MCC and the MNC in the message with current roaming agreements with the mobile's home network operator.

If the mobile is allowed to roam on its network, MSC/VLR 108 sends an "UpdateLocation" message to HLR 110 in the mobile's home network 114. The "UpdateLocation" message contains only the IMSI and a VLR address of MSC/VLR 108. Upon receiving the "UpdateLocation" message, HLR 110 stores the VLR address and responds to the "UpdateLocation" message with an "Insert Subscriber data" message. The "Insert Subscriber data" message transfers data pertaining to the mobile (i.e., subscriber) from HLR 110 to MSC/VLR 108. MSC/VLR 108 acknowledges the receipt of the subscriber data to HLR 110 and the HLR in turn acknowledges the completion of the location updating procedure to MSC/VLR 108. MSC/VLR 108 then sends a "Location Updating Accept" message to the mobile.

In the conventional location update procedure, roaming is determined based only on a MCC and a MNC. This causes problems in geographical areas in which competing network service providers have overlapping coverage. In an area where there is coverage from a home network operator and a competitor, a mobile recognizes both networks' MCC and MNC. However, if the home network operator's signal level and/or quality is lower than that of the competitor's, the mobile selects the competitor's network and may remain camped thereon for some time. This causes the home network operator to incur roaming charges on behalf of the subscriber, thus resulting in a loss of revenue. The home network operator could restrict roaming with the competitor's network. However, this causes roaming to be restricted wherever the competitor has coverage, including areas where the home network operator does not have coverage and wants to roam on the competitor's network.

As a solution, National Roaming Restriction has been implemented. In National Roaming Restriction, a MSC contains information of all the location areas it serves. For each location area, the MSC includes a table of networks (indicated by their MCC MNC) allowed to roam in that location area. FIG. 2 illustrates an implementation of National Roaming Restriction. As shown, mobile 202 initiates location update by sending a "Location Updating" message to MSC/VLR 208. The "Location Updating" message contains an IMSI and a LAI. The MSC/VLR 208 receives the message and determines whether the mobile is allowed to roam (i.e., whether to continue registration of the mobile) on its network based on the LAI. If the mobile is allowed to roam on its network, the MSC/VLR 208 sends an "UpdateLocation" message to HLR 210. If the mobile is not allowed to roam on its network, the MSC/VLR sends a "Location Updating Reject" message to the mobile. In National Roaming Restriction, in areas where there is coverage from a home network operator and a competitor, the competitor's MSC restricts the mobile from roaming in those location areas. Conversely, the home network operator restricts roaming of the competitor's subscribers in certain location areas.

Even though National Roaming Restriction controls roaming, a network service provider must rely on other service providers (i.e., competitors) to provision roaming restrictions correctly. A home network service provider does not have control over roaming of its subscribers. Further, a home network service provider has to depend on a competitor to troubleshoot its subscriber's problem.

In view of forgoing, there is a need for a better solution for controlling roaming.

SUMMARY OF THE INVENTION

The present invention provides a method for controlling domestic roaming and enables a home network operator to control roaming of its subscribers.

In the present invention, a MSC/VLR in a visited network is modified to send a LAI to a HLR in an "UpdateLocation" message. This is accomplished by modifying a Mobile Application Part (MAP) message of the "UpdateLocation" so that the LAI is embedded in the message. Further, the MSC/VLR is modified so that the MSC/VLR sends an "UpdateLocation" message to the HLR for every location area change while a subscriber is roaming in a competitor's network. Furthermore, in the present invention, the home network includes a Roaming Enhancement Node (REN). The REN includes a database that contains restricted location areas of the home network. The REN receives the "UpdateLocation" message from the MSC/VLR and determines whether to continue registration. The REN may be introduced as a separate network element. Alternatively, the functionality of the REN may be included in the HLR.

In one embodiment, a mobile initiates a location update procedure by sending a "Location Updating" message containing an IMSI and a LAI to a MSC/VLR in a visited network. The MSC/VLR in turn send an "UpdateLocation" message including the LAI, the IMSI, and a VLR address to a HLR in a home network. A REN intercepts the "UpdateLocation" message and determines whether to continue registration (i.e., allow to roam) based on the LAI in the message. If the mobile is roaming in a location area that is not restricted, the "UpdateLocation" message is forwarded to the HLR. If the mobile is roaming in a location area that is restricted, the REN sends a rejection response to the MSC/VLR with a rejection cause. The MSC/VLR in turn sends a "Location Updating" rejection response to the mobile.

DETAILED DESCRIPTION OF THE INVENTION

Reference will now be made in detail to the preferred embodiments of the present invention, examples of which are illustrated in the accompanying drawings.

Figure 1:
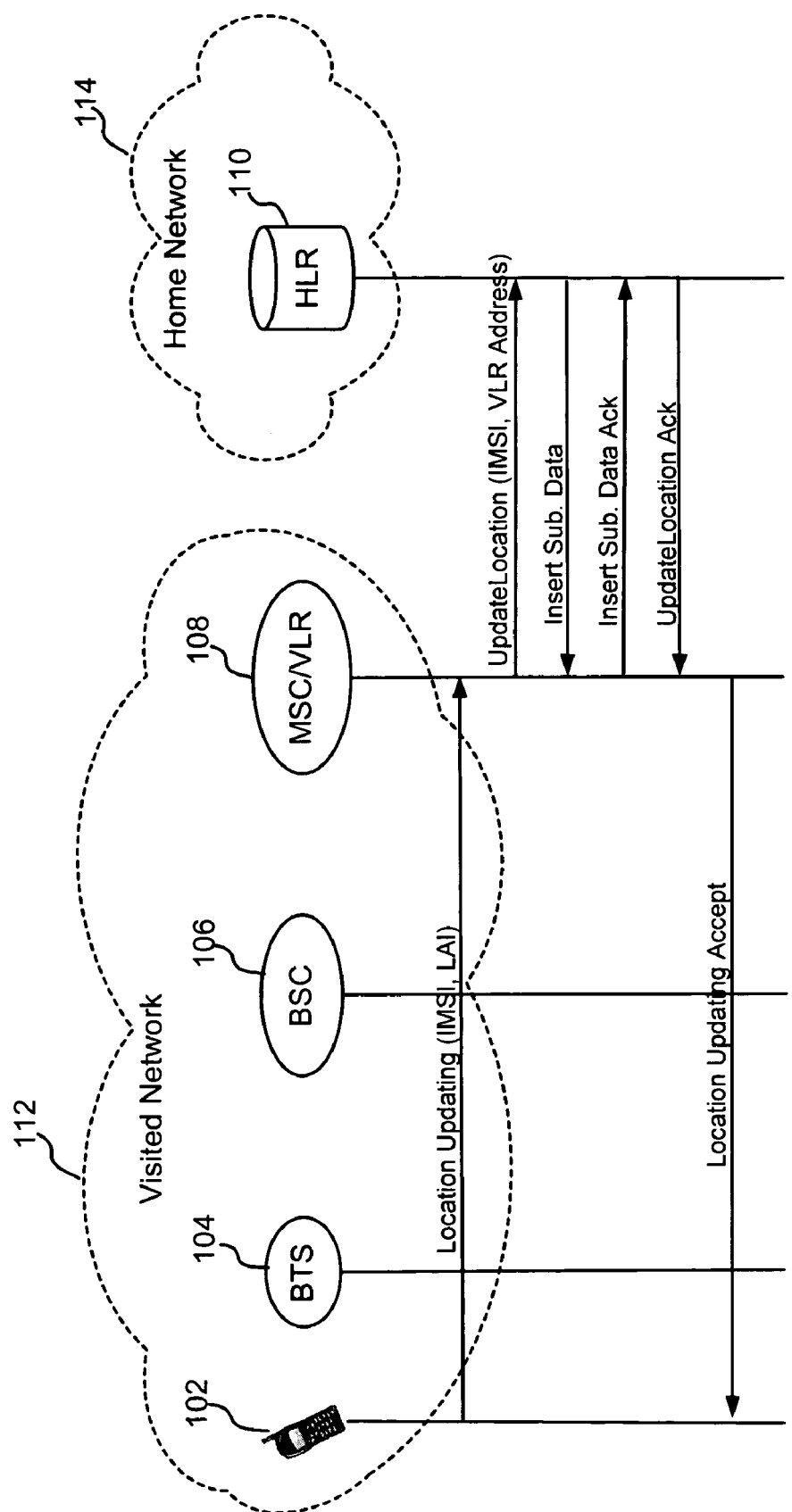
FIG. 1 illustrates a conventional location update procedure.
Figure 2:
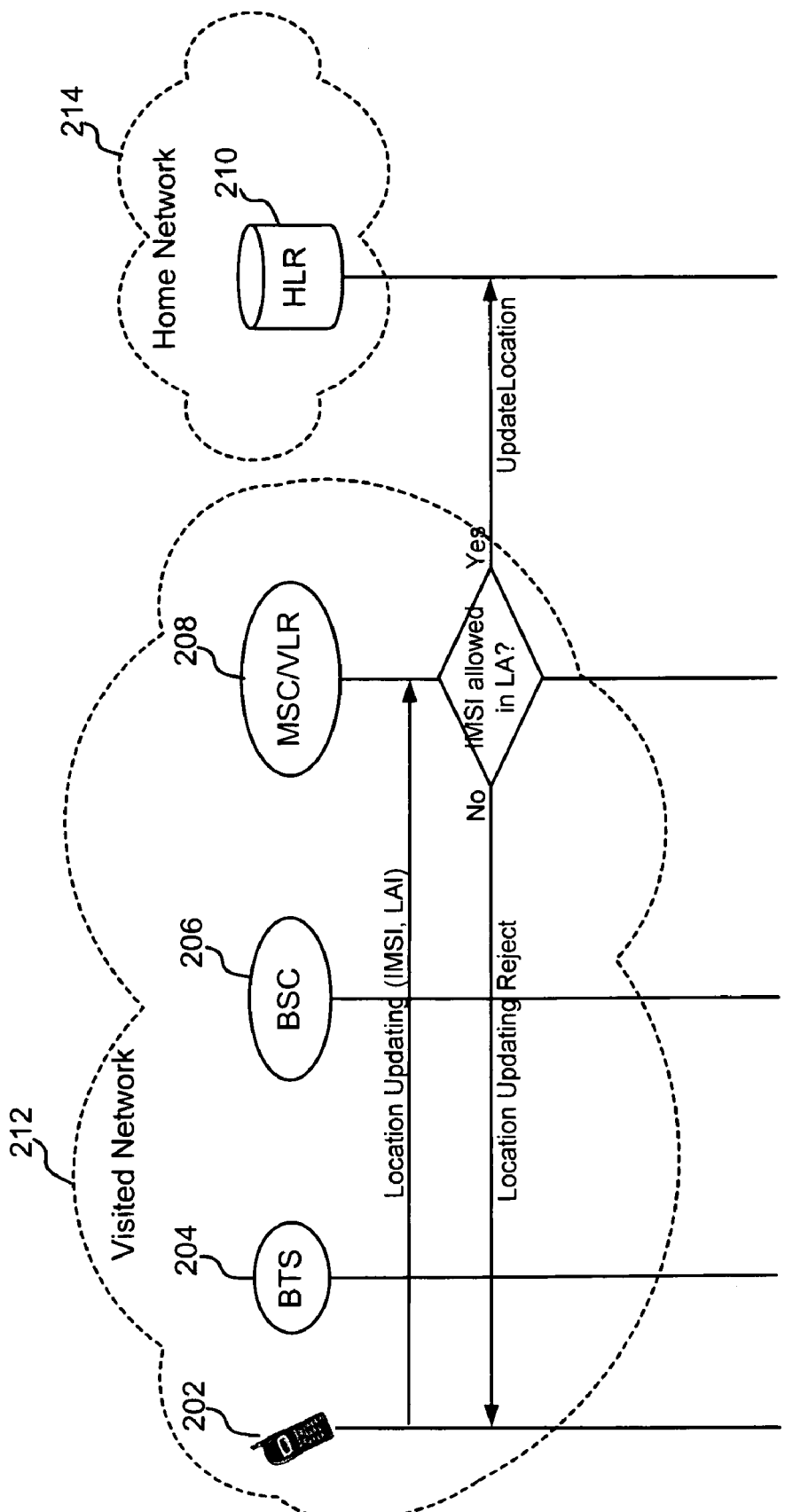
FIG. 2 illustrates a conventional roaming restriction.
Figure 3:
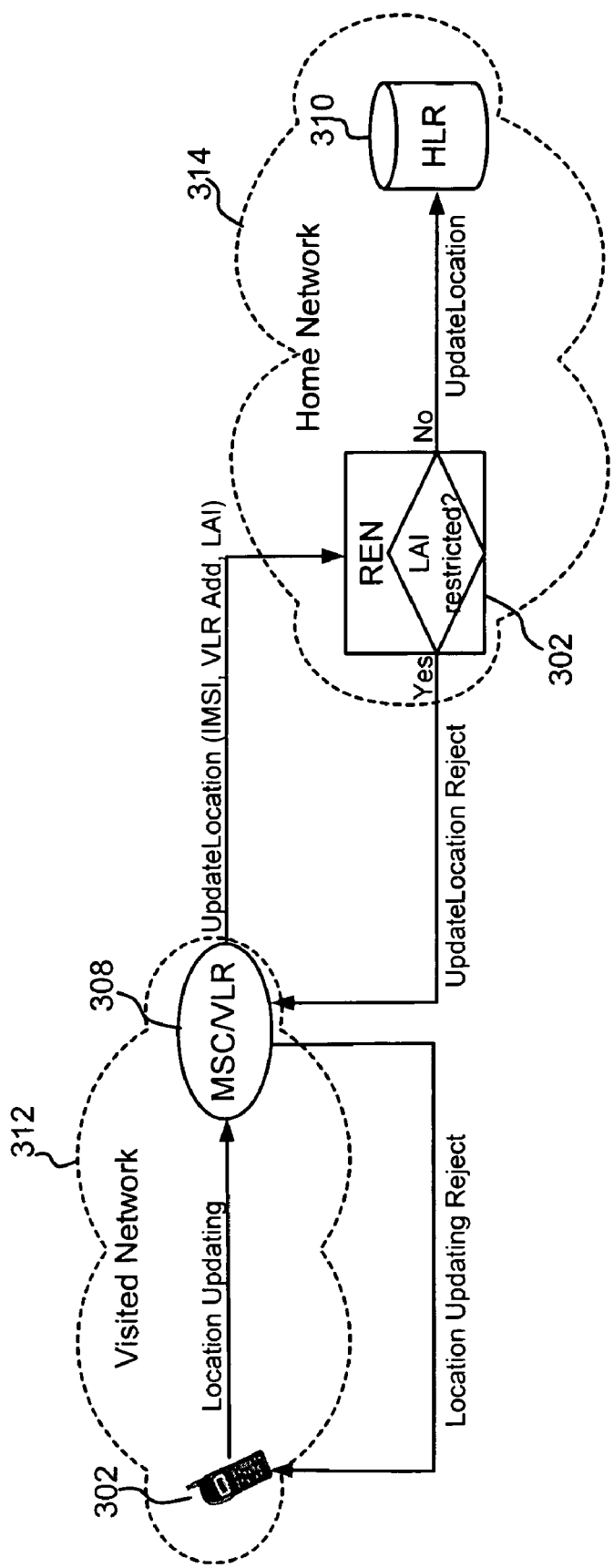
FIG. 3 illustrates a roaming control process according to a preferred embodiment of the present invention.

FIG. 3 illustrates a roaming control process according to a preferred embodiment of the present invention. In the present invention, a home network of a mobile includes a Roaming Enhancement Node (REN) 302. The REN includes a database containing a list of restricted location areas for the home network operator. The REN determines whether to continue registration (i.e., location update procedure) in response to a location update request from the mobile.

As shown, a mobile 302 in a visited network 312 initiates a location update procedure by sending a "Location Updating" message containing an IMSI and a LAI to a MSC/VLR 308. MSC/VLR 308 in turn sends an "UpdateLocation" message to HLR 310 in a home network 314. The "UpdateLocation" message contains the LAI, in addition to the IMSI and a VLR address. REN 320 in a home network 314 intercepts the "UpdateLocation" message and determines whether to continue the location update procedure based on the LAI in the message. If the mobile is roaming in a location area that is prohibited, the REN rejects the "UpdateLocation." The REN sends an "UpdateLocation" rejection response to MSC/VLR 308 with a rejection cause. The MSC/VLR then sends a "Location Updating" rejection response to the mobile with the same rejection cause. If the mobile is not from a location area that is restricted, the "UpdateLocation" message is forwarded to HLR 310. A more detailed description of an implementation of the roaming control process according to a preferred embodiment is described below.

In accordance with the present invention, the mobile sends the "Location Updating" message containing the IMSI and the LAI to the MSC/VLR in the visited network.

The MSC/VLR in the visited network is preferably modified to send the LAI to the HLR. Specifically, a MAP message of the "UpdateLocation" is modified so that the LAI is embedded in a "PrivateExtension" field in the MAP message. The MSC/VLR then sends the "UpdateLocation" message containing the LAI to the HLR. The following is an example of the modified MAP message. The modification is shown in bold.

```
UpdateLocation ::= MAP OPERATION
    ARGUMENT
                                    updateLocationArg
    UpdateLocationArg
```

```
UpdateLocationArg ::= SEQUENCE {
    imsi              IMSI,
    msc-Number        [1] ISDN-AddressString,
    vlr-Number        ISDN-AddressString,
    extensionContainer  ExtensionContainer
}
```

```
ExtensionContainer ::= SEQUENCE {
    privateExtensionList    [0]PrivateExtensionList
    ... }
```

```
PrivateExtensionList ::= SEQUENCE SIZE (1) OF PrivateExtension
```

```
PrivateExtension ::= SEQUENCE {
    extId           1 of ExtensionSet
    extType         LAI of ExtensionSet
}
```

| ExtensionSet | {1,LAI} |
|---|---|

| LAI—Location Area Identification |
|---|

The Location Area Identification (LAI) is a type 3 information element with 6 octets length.

| 8 | 7 | 6 | 5 | 4 | 3 | 2 | 1 | |
|---|---|---|---|---|---|---|---|---|
| | | Location Area Identification IEI | | | | | | octet 1 |
| MCC digit 2 | | | | MCC digit 1 | | | | octet 2 |
| MNC digit 3 | | | | MCC digit 3 | | | | octet 3 |
| MNC digit 2 | | | | MNC digit 1 | | | | octet 4 |
| | | | LAC | | | | | octet 5 |
| | | LAC (continued) | | | | | | octet 6 |

Further, the MSC/VLR in the visited network is modified to send the "UpdateLocation" message to the HLR for every location area change of its subscriber while the subscriber is in non-home domestic IMSI ranges. That is, when a subscriber is roaming in a domestic competitor's network, a MSC/VLR serving the subscriber in the competitor's network (i.e., visited network) is modified to send the "UpdateLocation" message to the subscriber's HLR every time the subscriber moves from one location area to another location area, even when the old location area and the new location area are served by the same MSC. This enables the home network operator to determine the exact location area from which its subscriber is receiving services. This applies to a normal location update procedure and an IMSI attach.

Figure 4:
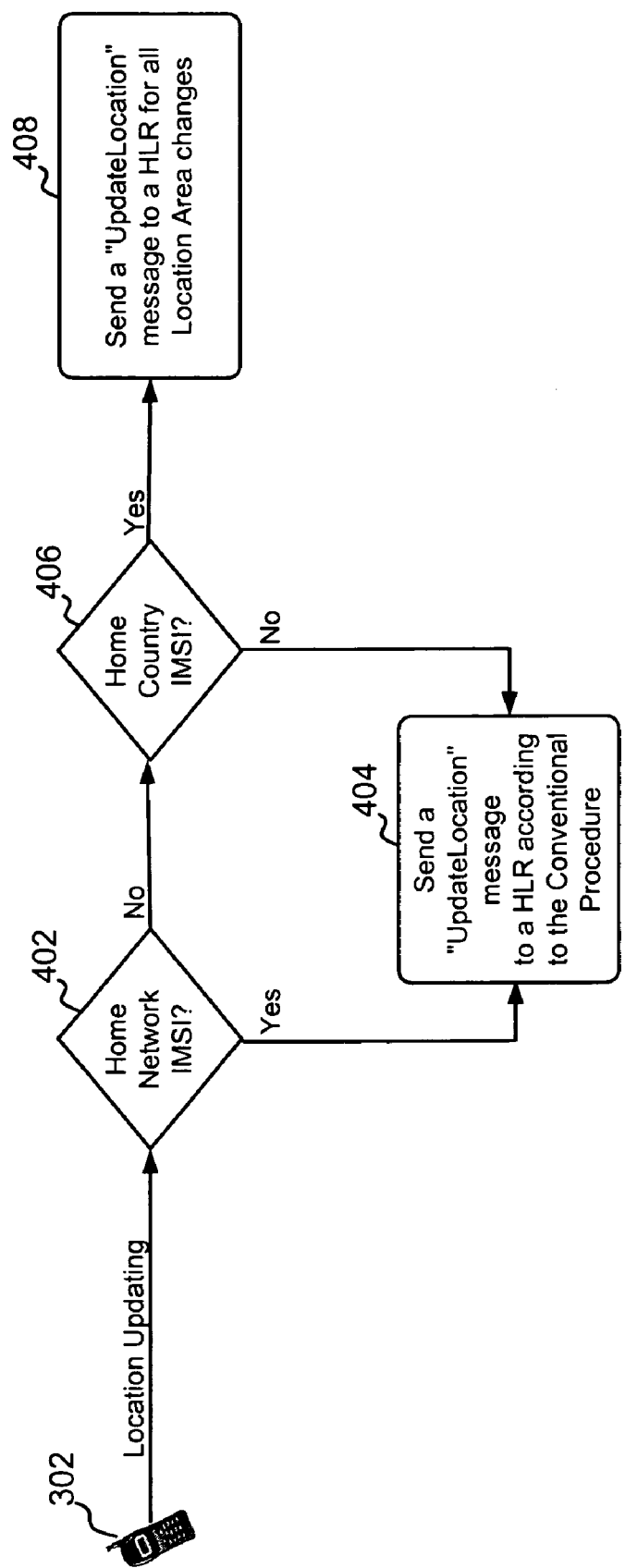
FIG. 4 illustrates how a location update procedure is processed at a MSC/VLR according to a preferred embodiment of the present invention.

FIG. 4 shows a series of steps for practicing features of the present invention. At step 402, an MSC/VLR receives a "Location Updating" message including the IMSI and the LAI from mobile 302 and determines whether the IMSI is its home network IMSI. That is, the MSC/VLR determines whether the mobile is in the mobile's home network. If the IMSI is a home network IMSI, at step 404, the MSC/VLR sends the "UpdateLocation" message to the HLR according to a conventional procedure. That is, the MSC/VLR sends the message to the HLR only under certain circumstances, rather then sending it every time when the location area change occurs.

If the IMSI is not a home network IMSI, at step 406, the MSC/VLR determines whether the IMSI is a home country IMSI. If the IMSI is not a home country IMSI, the MSC/VLR sends the "UpdateLocation" message to the HLR according to the conventional procedure.

If the IMSI is a home country IMSI, at step 408, the MSC/VLR then sends the "UpdateLocation" message to the HLR for every location area change. In other words, unlike the conventional procedure, the "UpdateLocation" message, in accordance with the present invention, is sent every time a location area change occurs while the mobile is domestically roaming.

The modified MSC/VLR sends the "UpdateLocation" message including the LAI to the HLR, but the message is first intercepted by the REN as shown in FIG. 3. The REN preferably includes a database that contains a list of restricted location areas for the home network operator. The REN receives the message and analyzes the "ExtensionContainer" field in the message. The REN then compares the LAI in the "Private ExtensionList" field in the message to its database and determines whether to continue the location update procedure. If the mobile is not in a location area that is restricted, the "UpdateLocation" message is forwarded to the HLR. If the mobile is roaming in a location area that is restricted, the REN sends an "UpdateLocation" rejection response to the MSC/VLR in the visited network with a rejection cause, for example, "Roaming not allowed in this Location Area." The following is an example of the "UpdateLocation" rejection response MAP message that the REN sends to the MSC/VLR.

```
UpdateLocation ::= OPERATION
RESULT
    updateLocationRes          UpdateLocationRes
ERRORS {RoamingNotAllowed}
```

```
RoamingNotAllowedParam ::= SEQUENCE {
    roamingNotAllowedCause     plmnRoamingNotAllowed (0)
    extensionContainer         ExtensionContainer
    ... }
```

```
ExtensionContainer ::= SEQUENCE {
    privateExtensionList       [0]PrivateExtensionList
    ... }
```

PrivateExtensionList ::= SEQUENCE SIZE (2) OF PrivateExtension

```
PrivateExtension ::= SEQUENCE {
    extId      2 of ExtensionSet
    extType    RejectCause of ExtensionSet
}
```

| ExtensionSet | {1,LAI},(2,RejectCause) |
|---|---|

| Reject Cause |
|---|

The Reject Cause is a type 3 Informational Element with 2 Octets.

| 8 | 7 | 6 | 5 | 4 | 3 | 2 | 1 | |
|---|---|---|---|---|---|---|---|---|
| | | | Reject cause IEI | | | | | octet 1 |
| | | | Reject cause value | | | | | octet 2 |

Reject cause value (octet 2)
Bits
8 7 6 5 4 3 2 1

| 0 | 0 | 0 | 0 | 1 | 1 | 0 | 1 | Roaming not allowed in this location area |
|---|---|---|---|---|---|---|---|---|

The MSC/VLR receives the "UpdateLocation" rejection response from the REN and recognizes the "ExtensionContainer" field with the rejection cause. The MSC/VLR then sends the "Location Updating" rejection response with the same rejection cause to the mobile. In an alternate embodiment, the functionality of the REN may be included or integrated in the HLR. In such a case, the HLR receives the "UpdateLocation" message directly from the MSC/VLR and determines whether to continue registration.

The present invention may also be used in different wireless communications networks. For example, the present invention may be used in a GPRS network. In this case, a MSC/VLR will be replaced with a serving GPRS support node (SGSN).

As will be appreciated by those skilled in the art, the present invention enables a home network operator to better control roaming of its subscribers. The present invention also enables a home network operator to determine the exact location area from which its subscriber is receiving services. Accordingly, if the home network operator wants to prevent its subscribers from receiving services from a particular location area, the home network operator can easily set the REN to reject the location update request and thereby preclude roaming. Further, a network operator can prevent service based on location area in an attempt to force a technology change. Even though this data will require sharing between the operators, each operator can easily verify the areas where service is being obtained. Again, if a network operator feels a location area on a competitor's network should not be allowed to provide service to its subscribers, the change can be quickly made on a REN (or HLR) in its home network.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A method for controlling roaming in communication systems having overlapping coverage comprising:
provisioning a Roaming Enhancement Node (REN) in a mobile's home network;
receiving a Location Updating message from the mobile at a MSC/VLR in a visited network, wherein the Location Updating message includes a Location Area Identity (LAI);
sending the LAI from the MSC/VLR to a HLR in the mobile's home network in an UpdateLocation message;
intercepting the UpdateLocation message at the REN; and
determining whether to continue registration of the mobile at the REN based at least in part on whether the home network provides coverage for the same LAI as the visited network.

2. The method of claim 1, wherein the REN includes a database that contains a list of restricted location areas for the mobile's home network.

3. The method of claim 2, wherein the REN determines whether to continue registration by comparing the LAI in the UpdateLocation message to the list of restricted location areas in the database.

4. The method of claim 2, wherein the REN sends a first rejection response including a rejection cause to the MSC/VLR if the mobile is roaming in one of the restricted location areas for the mobile's home network.

5. The method of claims 4, wherein the MSC/VLR sends a second rejection response including the rejection cause to the mobile.

6. The method of claim 2, wherein the REN forwards the UpdateLocation message to the HLR if the mobile is not in one of the restricted location areas for the mobile's home network.

7. The method of claim 1, wherein the REN is integrated in the HLR.

8. The method of claim 1, wherein the LAI is included in a "PrivateExtention" field in a Mobile Application Part (MAP) message of the UpdateLocation message.

9. The method of claim 8, wherein the method further includes analyzing an "ExtensionContainer" field in the MAP message of the UpdateLocation message at the REN.

10. The method of claim 1, wherein the method further includes sending the UpdateLocation message from the MSC/VLR to the HLR every time the mobile changes location area while the mobile is roaming in a domestic non-home network.

11. A method for controlling roaming in communication systems having overlapping coverage comprising:
provisioning a node adapted to determine whether to allow roaming of a mobile in the mobile's home network;
receiving a location update request along with a Location Area Identity (LAI) from the mobile at a MSC/VLR in a visited network;
sending the LAI from the MSC/VLR to a HLR in the mobile's home network in an UpdateLocation message;
receiving the UpdateLocation message at the node; and
determining whether to allow roaming of the mobile at the node, wherein the step of determining is based at least in part on whether the home network provides coverage for the same LAI as the visited network,
wherein the node forwards the UpdateLocation message to the HLR if the mobile is allowed to roam, and wherein the node sends a first rejection response to the MSC/VLR if the mobile is not allowed to roam.

12. The method of claim 11, wherein the node includes a database that contains a list of restricted location areas for the mobile's home network.

13. The method of claim 12, wherein the node determines whether to allow roaming by comparing the LAI in the UpdateLocation message to the list of restricted location areas in the database.

14. The method of claim 11, wherein the method further includes sending the UpdateLocation message from the MSC/VLR to the HLR every time the mobile changes location area while the mobile is roaming in a domestic non-home network.

15. The method of claim 11, wherein the LAI is included in a field in a MAP message of the UpdateLocation message.

16. The method of claim 11, wherein the REN is integrated in the HLR.

17. The method of claim 11, wherein the first rejection response includes a rejection cause.

18. The method of claim 17, wherein the MSC/VLR sends a second rejection response including the rejection cause to the mobile in response to the first rejection response from the node.

* * * * *